(12) United States Patent
Yang

(10) Patent No.: US 7,312,648 B2
(45) Date of Patent: Dec. 25, 2007

(54) TEMPERATURE SENSOR

(75) Inventor: Hung-Ming Yang, Hsinhua (TW)

(73) Assignee: Himax Technologies, Inc., Tainan County (TW)

( * ) Notice: Subject to any disclaimer, the term of this patent is extended or adjusted under 35 U.S.C. 154(b) by 187 days.

(21) Appl. No.: 11/165,643

(22) Filed: Jun. 23, 2005

(65) Prior Publication Data

US 2007/0009006 A1    Jan. 11, 2007

(51) Int. Cl.
*H01L 35/00* (2006.01)
(52) U.S. Cl. ...................................... 327/512; 327/513
(58) Field of Classification Search ................ 327/512; 374/178; 702/130
See application file for complete search history.

(56) References Cited

U.S. PATENT DOCUMENTS

| 4,505,600 | A | | 3/1985 | Suzuki et al. ............... 374/170 |
| 5,585,752 | A | * | 12/1996 | Botti et al. .................. 327/131 |
| 5,982,221 | A | * | 11/1999 | Tuthill ......................... 327/512 |
| 6,097,239 | A | * | 8/2000 | Miranda et al. ............. 327/512 |
| 6,934,645 | B2 | * | 8/2005 | Kim ............................. 702/64 |
| 7,010,440 | B1 | * | 3/2006 | Lillis et al. .................. 327/512 |

* cited by examiner

*Primary Examiner*—Cassandra Cox
(74) *Attorney, Agent, or Firm*—J.C. Patents

(57) ABSTRACT

A temperature sensor, which comprises a temperature-dependent element, a comparator unit, first/second capacitors and first/second switching capacitors, is provided. The temperature-dependent element has an input terminal selectively coupled to one of a first current source and a second current source, and has an output terminal. The comparator unit comprises a comparator and first/second feedback capacitors. One end of the first switching capacitor is coupled to the first comparator input terminal, and another end of the first switching capacitor is selectively coupled to one of two different voltages. One end of the second switching capacitor is coupled to the second comparator input terminal, and another end of the second switching capacitor is selectively coupled to one of two different voltages.

7 Claims, 2 Drawing Sheets

TEMPERATURE SENSOR

BACKGROUND OF THE INVENTION

1. Field of Invention

The present invention relates to a temperature sensor. More particularly, the present invention relates to a temperature sensor which having two capacitors coupled to temperature-independent voltage sources for increasing S/N ratio of the temperature sensor.

2. Description of Related Art

Recently, bipolar transistors or diodes are used as temperature sensors in CMOS technique. FIG. 1A shows a conventional temperature sensor. In the temperature sensor 10, the diode is selectively connected to two current sources 130 and 132 by using a switch 102. During operation, the diode 100 is connected to the current source 130 to receive the current $If_1$. The voltage difference $\Delta V$ between capacitors 120 and 122, each of which has a capacitance C1, can be obtained by the following equation:

$$\Delta V = \frac{kT}{q} = \ln(If_1/I_s)$$

Accordingly, after connecting diode 100 to the current source 130, the diode 100 is connected to the current source 132. Thus, after operations of switch capacitor circuits, which includes capacitors 120~126 and the comparator 110, the output voltage Vout of the temperature sensor 10 could be obtained by the following equation:

$$Vout = \frac{C1}{C2}\frac{kT}{q}\ln\frac{If_1}{If_2}$$

In other words, the output voltage Vout is in proportion to the absolute temperature k. However, it is rarely to operate at circumstances wherein the temperature is lower than −40° C. Therefore, although the temperature sensor has a theoretically sensing range between −273° C. and, for example, 127° C., the sensing range between −273° C. and −40° C. is rarely used. Referring to FIG. 1B, a voltage-temperature curve diagram of a common-used temperature sensor is shown. As shown in the Figure, the output voltage of the temperature sensor is 3.3V when the temperature is 127° C., and the output voltage is 1.9V when the temperature is −40° C. It is obvious that the voltage range between 0V and 1.9V is wasted when a part of sensing range between −273° C. and −40° C. is not used. Accordingly, only part of the sensing range (1.9V~3.3V) is used to represent a temperature range −40~127, and therefore precision of the result cannot be increased due to the limitation.

SUMMARY OF THE INVENTION

One aspect of the invention is to provide a temperature sensor that can increase the signal-noise ratio and precision of the sensing result.

The present invention provides a temperature sensor, which comprises a temperature-dependent element, a comparator unit, first/second capacitors and first/second switching capacitors. The temperature-dependent element has an input terminal and an output terminal, and the input terminal selectively coupled to one of a first current source and a second current source. The comparator unit comprises a comparator and first/second feedback capacitors. The comparator has first/second comparator input terminals and first/second comparator output terminals. The first feedback capacitor is coupled between the first comparator input terminal and the first comparator output terminal. The second feedback capacitor is coupled between the second comparator input terminal and the second comparator output terminal.

Further, the first capacitor is coupled between the input terminal and the first comparator input terminal. The second capacitor is coupled between the output terminal and the second comparator input terminal. One end of the first switching capacitor is coupled to the first comparator input terminal, and another end of the first switching capacitor is selectively coupled to one of two different voltages. One end of the second switching capacitor is coupled to the second comparator input terminal, and another end of the second switching capacitor is selectively coupled to one of two different voltages.

Specifically, the voltages couples to the first/second switching capacitors are temperature-independent voltages.

In one embodiment, the first switching capacitor is coupled to the first predetermined voltage and the second switching capacitor is coupled to the second predetermined voltage when the temperature-dependent element is coupled to the second current source.

Accordingly, because the switching capacitors switch between the first/second predetermined voltages and ground when the temperature-dependent element switches between the first/second current source, output voltages on the first/second comparator output terminals is affected thereof. Thus, those skilled in the art could easily map a chosen temperature range to a chosen voltage range, and the signal-noise ratio and precision of the sensed result could be easily designed.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
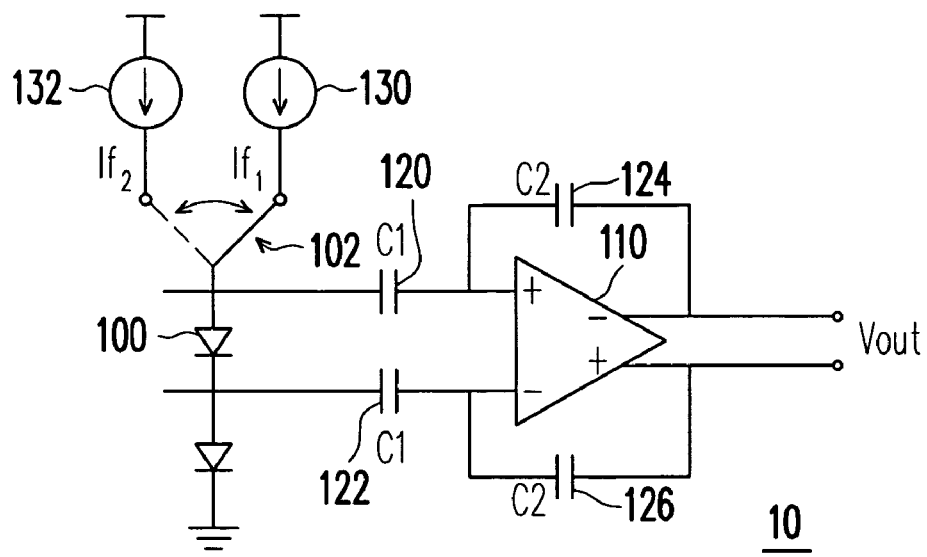
FIG. 1A is a temperature sensor designed in the prior art.

Reference will now be made in detail to the present preferred embodiments of the invention, examples of which are illustrated in the accompanying drawings. Wherever possible, the same reference numbers are used in the drawings and the description to refer to the same or like parts.

Figure 2:
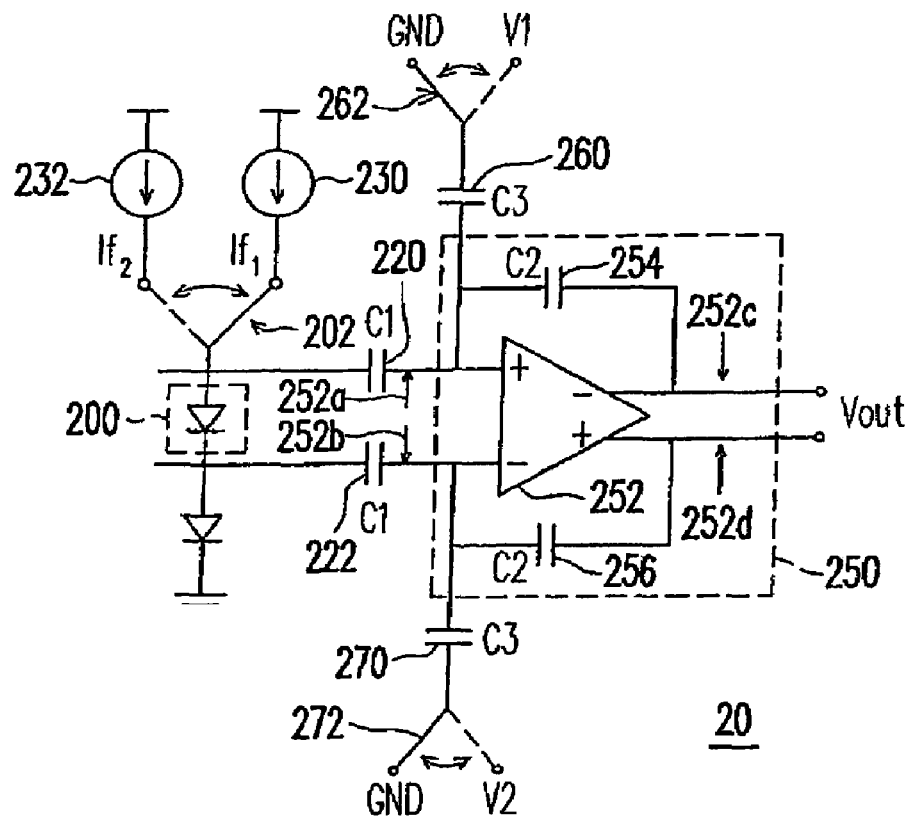
FIG. 2 is a circuit diagram of a temperature sensor according to one embodiment of the present invention.

Referring to FIG. 2, a circuit diagram of a temperature sensor according to one embodiment of the present invention is shown therein. In the embodiment, temperature sensor 20 comprises a temperature-dependent element 200, a comparator unit 250, capacitors 220/222 and switching capacitors 260/270 (hereinafter, capacitors), wherein the comparator unit 250 comprises a comparator 252 and feedback capacitors 254/256 (hereinafter, capacitors). The temperature-dependent element 200 is an element that the voltage difference between input terminal and output terminal is related, for example, either proportional or inverse proportional, to the temperature. Although the temperature-dependent element 200 in the embodiment is a diode, it can be implemented by using diode-connected MOS or bipolar transistor. Further, capacitors 220 and 222 have a capacitance value C1, capacitors 254 and 256 have a capacitance value C2 and capacitors 260 and 270 have a capacitance value C3.

As shown in FIG. 2, input terminal of the temperature-dependent element 200 is selectively coupled to the current sources 230 or 232 by using a switch 202. The input terminal of the temperature-dependent element 200 further couples to one end of the capacitor 220, while another end of the capacitor couples to the comparator input terminal 252a. Output terminal of the temperature-dependent element 200 couples to one end of the capacitor 222 while another end of the capacitor 222 couples to the comparator input terminal 252b. Capacitor 254 couples between the comparator input terminal 252a (positive input in the embodiment) and the comparator output terminal 252c (negative output in the embodiment) while capacitor 256 couples between the comparator input terminal 252b (negative input in the embodiment) and the comparator output terminal 252d (positive output in the embodiment).

A main characteristic of the embodiment is that there are two capacitors 260 and 270 in the temperature sensor 20. One end of the capacitor 260 couples to the comparator output terminal 252a while another end of the capacitor 260 selectively couples to GND or voltage V1. One end of the capacitor 270 couples to the comparator output terminal 252b while another end of the capacitor 270 selectively couples to GND or voltage V2. In the embodiment, the voltages V1 and V2 are temperature-independent voltages.

Operation of the temperature sensor 20 is described as follow. At first, the temperature-dependent element 200 couples to the current source 230 for receiving the current $If_1$, and the capacitors 260 and 270 couple to GND via switches 262 and 272, respectively. After that, the temperature-dependent element 200 couples to the current source 232 for receiving the current $If_2$, the capacitor 260 couples to voltage V1 and the capacitor 270 couples to voltage V2. Accordingly, charges stored in the capacitors 260 and 270 are coupled to the capacitors 254 and 256 such that charges in the capacitors 220 and 222 generated by current $If_1$ could be compensated and, therefore, output voltage Vout is changed.

The output voltage Vout generated by comparator output terminals 252c and 252d could be estimated by using following equation:

$$Vout = \frac{C1}{C2}\frac{kT}{q}\ln\frac{If_1}{If_2} - \frac{C3}{C2}(V1 - V2)$$

Figure 3:
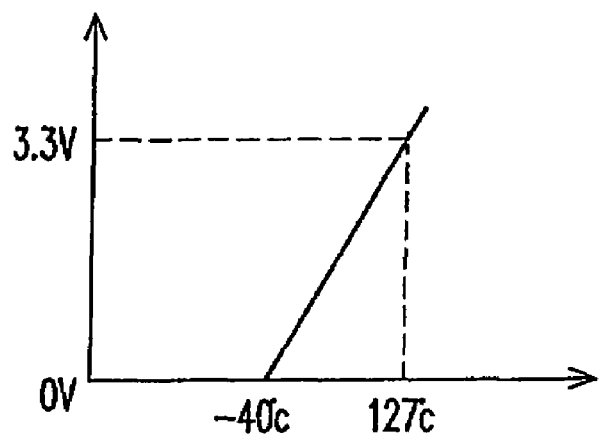
FIG. 3 is a voltage-temperature curve diagram of a temperature sensor according to one embodiment of the present invention.

Thus, the output voltage Vout could be adjusted by selecting different values of C1, C2, C3, V1 and V2. As shown in FIG. 3, those skilled in the art can easily determine proper values of C1, C2, C3, V1 and V2 such that the output voltage is different from the curve shown in FIG. 1B, for example, the output voltage is 0V when the temperature is −40° C. and is 3.3V when the temperature is 127° C.

Figure 1B:
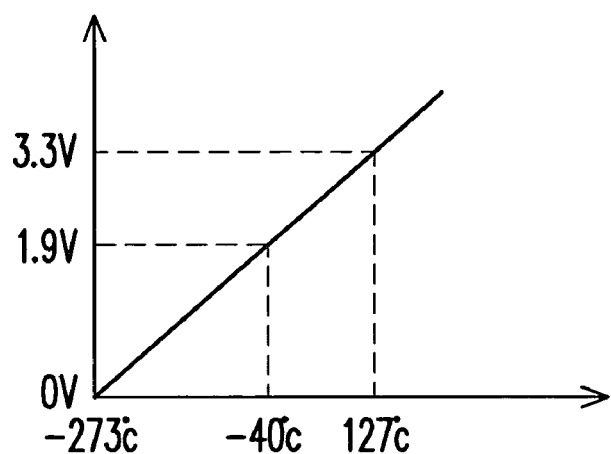
FIG. 1B is a voltage-temperature curve diagram of a common-used temperature sensor.

Comparing to the voltage-temperature curve shown in FIG. 1B, the total range of the output voltage (0V~3.3V) in the embodiment represents a temperature range between −40° C.~127° C. Therefore, the precision of the temperature sensor 20 is increased, or, the signal-noise ratio is increased.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A temperature sensor, comprising:
    a temperature-dependent element, having an input terminal and an output terminal, the input terminal selectively coupled to one of a first current source and a second current source;
    a comparator unit, comprising:
        a comparator, having a first and second comparator input terminals and first and second comparator output terminals;
        a first feedback capacitor, coupling between the first comparator input terminal and the first comparator output terminal; and
        a second feedback capacitor, coupling between the second comparator input terminal and the second comparator output terminal;
    a first capacitor, coupling between the input terminal of the temperature-dependent element and the first comparator input terminal;
    a second capacitor, coupling between the output terminal of the temperature-dependent element and the second comparator input terminal;
    a first switching capacitor, one end of the first switching capacitor being directly connected to the first comparator input terminal, another end of the first switching capacitor being selectively coupled to one of first and second voltages; and
    a second switching capacitor, one end of the second switching capacitor being directly connected to the second comparator input terminal, another end of the second switching capacitor being selectively coupled to one of third and fourth voltages.

2. The temperature sensor of claim 1, wherein the temperature-dependent element comprises a bipolar transistor.

3. The temperature sensor of claim 1, wherein the temperature-dependent element comprises a diode.

4. The temperature sensor of claim 3, wherein an anode of the diode is the input terminal, and a cathode of the diode is the output terminal.

5. The temperature sensor of claim 1, wherein the first and second switching capacitors are respectively coupled to the first voltage and the third voltage when the temperature-dependent element is coupled to the second current source.

6. The temperature sensor of claim 1, wherein the first voltage and the third voltage are temperature-independent voltages.

7. The temperature sensor of claim 1, wherein the second voltage and the fourth voltage are GND.

* * * * *